(12) United States Patent
White et al.

(10) Patent No.: US 9,394,108 B2
(45) Date of Patent: Jul. 19, 2016

(54) WHEEL LIFTER AND TIPPER

(71) Applicants: Bosch Automotive Service Solutions LLC, Warren, MI (US); Robert Bosch GmbH, Stuttgart (DE)

(72) Inventors: Michael White, Montgomery City, MO (US); Robert Kochie, Dodge Center, MN (US); Robert Jensen, Clarks Grove, MN (US)

(73) Assignee: Robert Bosch GmbH, Stuttgart (DE)

( * ) Notice: Subject to any disclaimer, the term of this patent is extended or adjusted under 35 U.S.C. 154(b) by 7 days.

(21) Appl. No.: 14/449,836

(22) Filed: Aug. 1, 2014

(65) Prior Publication Data

US 2016/0031647 A1     Feb. 4, 2016

(51) Int. Cl.
| | |
|---|---|
| *B60C 25/02* | (2006.01) |
| *B65G 7/08* | (2006.01) |
| *B25H 5/00* | (2006.01) |
| *B65G 7/12* | (2006.01) |

(52) U.S. Cl.
CPC .. *B65G 7/08* (2013.01); *B25H 5/00* (2013.01); *B65G 7/12* (2013.01); *B65G 2201/0273* (2013.01)

(58) Field of Classification Search
USPC ........ 294/24, 25, 26; 157/1.3, 1.33, 1.17, 1.1, 157/1.11; 254/25, 120, 131
See application file for complete search history.

(56) References Cited

U.S. PATENT DOCUMENTS

| | | | | |
|---|---|---|---|---|
| 1,100,032 A | * | 6/1914 | Speck | B60C 25/02 157/1.3 |
| 1,567,025 A | * | 12/1925 | Allison | B60C 25/02 157/1.3 |
| 2,317,072 A | * | 4/1943 | Martin | B60C 25/02 157/1.17 |
| 2,599,938 A | * | 6/1952 | Price | B66F 19/005 294/15 |
| 4,801,166 A | * | 1/1989 | Jordan | A47J 43/288 294/10 |
| 6,390,522 B1 | * | 5/2002 | Rucker | B65F 1/1405 220/315 |
| 6,588,479 B1 | * | 7/2003 | Kliskey | B60C 25/02 157/1.1 |
| 6,684,927 B1 | * | 2/2004 | Kliskey | B60C 25/02 157/1.17 |
| 7,156,141 B1 | * | 1/2007 | Kliskey | B60C 25/02 157/1 |
| 7,261,136 B1 | * | 8/2007 | Kliskey | B60C 25/04 157/1.17 |
| 7,267,155 B2 | * | 9/2007 | Brahler, II | B60C 25/02 157/1.17 |
| 2002/0195207 A1 | * | 12/2002 | Magnani | B60C 25/02 157/1.3 |

* cited by examiner

*Primary Examiner* — Paul T Chin
(74) *Attorney, Agent, or Firm* — Maginot Moore & Beck LLP

(57) ABSTRACT

A wheel lifter and tipper includes a hook end with a plurality of notches that are each configured for different wheel manipulations and/or for different types of wheels. Each of the plurality of notches is configured to tip wheels into an upright position without deflating or breaking a bead of a tire of the wheel. The device further includes a u-shaped bend configured to support a wheel during a wheel loading manipulation, and a pad end rotationally mounted to a body of the device. During the loading manipulation, the pad end remains stationary and acts as a fulcrum and the body with the u-shaped bend acts as a lever arm. The device is passed through a center of the wheel, and the lever arm is raised or lowered in order to raise or lower the wheel to or from a raised surface, respectively.

17 Claims, 9 Drawing Sheets

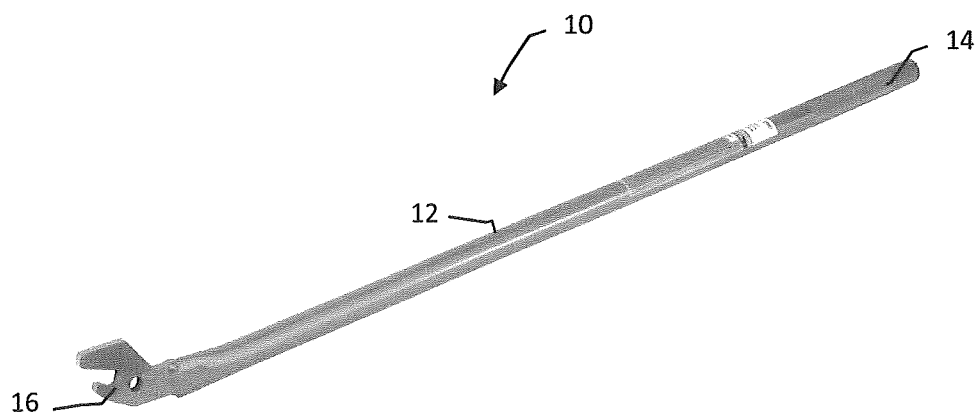
FIG. 1 - PRIOR ART
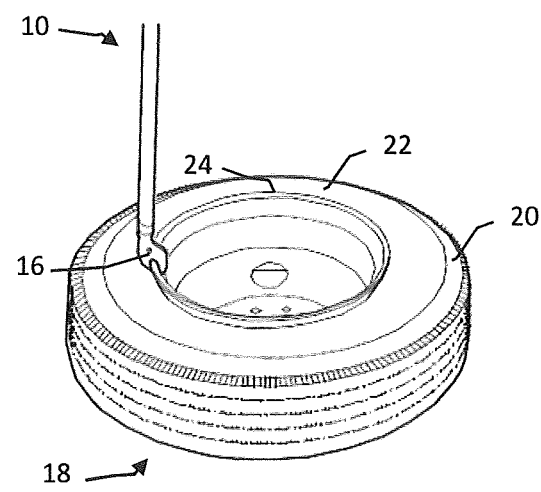
FIG. 2 - PRIOR ART

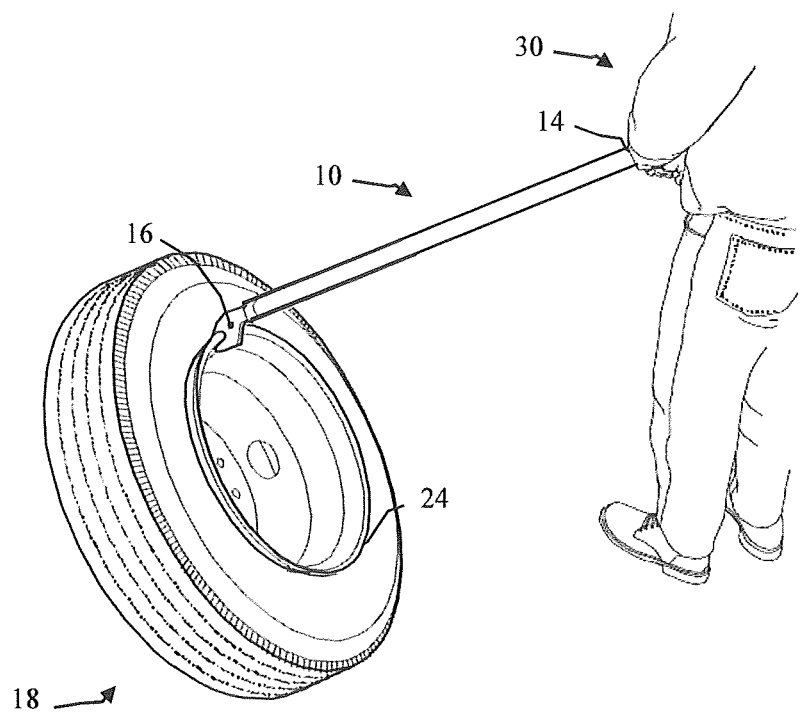
FIG. 3 - PRIOR ART
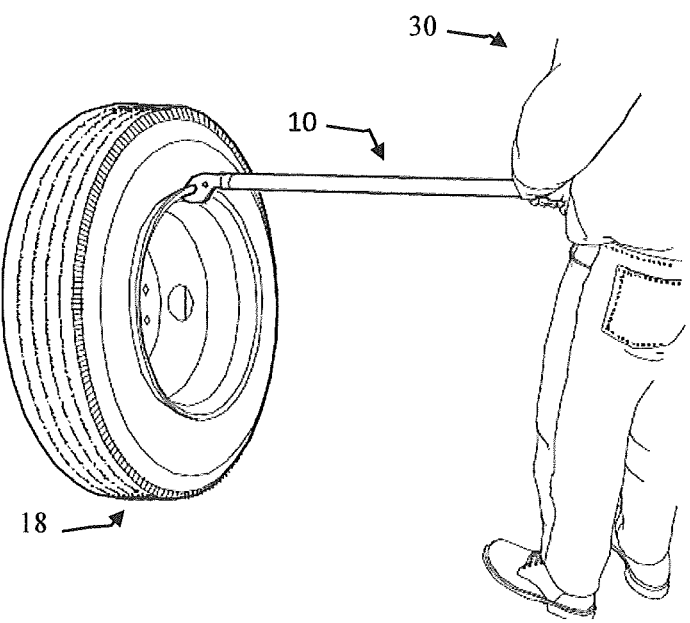
FIG. 4 - PRIOR ART

US 9,394,108 B2

WHEEL LIFTER AND TIPPER

TECHNICAL FIELD

This disclosure relates generally to automotive tools, and, more particularly, to wheel tipper and wheel loader tools.

BACKGROUND

Large tires and wheel rims, such as those used on large vehicles and trucks, can be extremely heavy, with an individual wheel weighing as much as 200 to 250 lbs. or more. This large size and weight makes handling large wheels difficult and labor intensive, and presents safety and health risks. For technicians performing various tasks, such as tipping wheels into an upright position, flipping a wheel during service, loading wheels for storage or transport, or even moving a wheel around a workspace, back injuries are common due at least in part to the wheel's high weight and the postures and movements customarily used to manipulate wheels.

Wheel tippers have been used in order to facilitate various tasks which require tipping or flipping a wheel. A wheel tipper is customarily a bar with a gripping end that engages with a wheel so that the wheel tipper can act as a lever when used by a technician. As an example, FIG. 1 illustrates a wheel tipper 10, sold by Bosch Automotive Service Solutions as product no. OTC 5082. The wheel tipper 10 comprises a body 12 that includes a grip end 14, and a hook end 16.

FIGS. 2-4 illustrate an example of a customary use example of the wheel tipper 10 for tipping a wheel 18 into an upright position. Before the wheel 18 is tipped, a tire 20 of the wheel 18 is deflated and a bead 22 of the tire 20 is broken, in order to expose a rim 24 of the wheel 18. FIG. 2 illustrates how the hook end 16 of the wheel tipper 10 is hooked to the rim 24. In FIG. 3, a technician 30, positioned on a side of the wheel 18 opposite from a side where the hook end 16 is hooked to the rim 24, pulls on the grip end 14 of the wheel tipper 10 until the wheel 18 is in an upright position as illustrated in FIG. 4.

It is desirable, for various tasks, to manipulate a wheel without deflating the tire or breaking the bead. However, such tasks cannot be accomplished using a customary wheel tipper, as deflating the tire and breaking the bead are necessary in order to expose the wheel rim to be gripped by the hook end. Further, while a wheel tipper facilitates tasks involving tipping or flipping a wheel, other tasks, such loading wheels for storage or transport, require lifting or manipulating wheels in ways that are not achievable with a wheel tipper. Therefore, what is needed is a device that facilitates different modes of manipulating different types of wheels without damaging the wheel or requiring deflating the tire or breaking the bead.

SUMMARY

The following is a brief summary of subject matter that is described in greater detail herein. This summary is not intended to be limiting as to the scope of the claims.

In an embodiment, a wheel lifter and tipper device includes a body that has a hook end and a distal end opposite the hook end. The hook end defines a plurality of notches, where each notch is configured for a different wheel and/or a different wheel manipulation. The distal end has a grip configured to be gripped by a user during a tipping wheel manipulation.

A first notch resembles a triangular divot in an end face of the hook end, and has a first surface on a mid-plane of the hook end and a second surface forming an acute angle with the first surface, forming a lip having a radial edge viewed in a direction normal to the mid-plane. The first notch is configured to hook a hole of a wheel having a hub flange facing downward.

A second notch resembles a substantially square-shaped divot in a side of the hook end, with an inner surface parallel to the mid-plane and perpendicular sidewalls. The sidewalls extend from the side and beyond the mid-plane. A length of the sidewalls is approximately equal to a length of the inner surface. The second notch is configured to hook a wheel with an aluminum rim.

A third notch resembles a substantially rectangle-shaped divot in a side of the hook end, with an inner surface parallel to the mid-plan and perpendicular sidewalls. The sidewalls extend from the side and beyond the mid-plane. A length of the sidewalls is greater than a length of the inner surface. The second notch is configured to hook a wheel with a steel rim.

The device can be used to tip a wheel into an upright position by hooking the wheel with an appropriate hook, and pulling down and away from the wheel on a grip of the distal end of the device.

In an embodiment, the wheel lifter and tipper device further includes a grip portion, a u-shaped bend and a pad end. The u-shaped bend is configured to be passed through and support a wheel during a wheel loading manipulation. The u-shaped bend has a plurality of bends at various angles such that, when the device is passed through the wheel and a grip portion is raised, causing the body of the device to act as a lever arm lifting or lowering the wheel, the wheel slides along the various bends so as to move in a desired direction. In other words, the bends of the u-shaped bend guide the wheel along various slide angles as the wheel is raised or lowered via the lever action of the device.

In an example, a first bend portion is at about a 55 degree angle from the grip portion, a second bend portion is at about a −18 degree angle from the first bend portion, a third bend portion is at about a −53 degree angle from the second bend portion, a fourth bend portion is substantially parallel to the grip portion, and a fifth bend portion is at about a −25 degree angle from the fourth bend portion.

The pad end is placed on a raised surface and remains stationary, acting as a fulcrum for the lever action of the body of the device. The pad end has a pad foot that is placed on the raised surface, and a rotational mount that enables the body to rotate about the pad foot.

The device can be used to both load and unload a wheel to and from the raised surface. Additionally, the end of the device opposite the pad end can include a hook end that can be used to perform wheel tipping manipulations similar to those described above; but that a user grips the fourth bend portion of the u-shaped bend proximate to the pad end, rather than a grip end.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 1 shows a perspective view of a prior art wheel tipper.

FIG. 2 shows a perspective illustration of a hook end of a prior art wheel tipper hooked onto a rim of a deflated tire with a broken bead.

FIG. 3 shows a perspective illustration of a user tipping the wheel of FIG. 2 with the prior art wheel tipper.

FIG. 4 shows a perspective illustration of the wheel of FIG. 2 tipped into an upright position.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Figure 5:
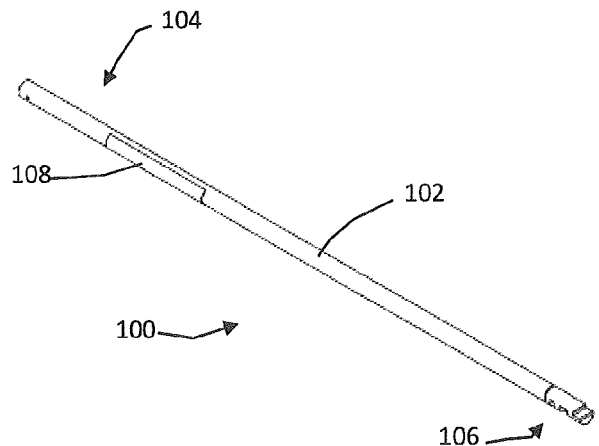
FIG. 5 shows a perspective illustration of a wheel tipper according to the present disclosure.

FIG. 5 is a perspective view of an embodiment of a wheel tipper 100 according to the present disclosure. The wheel tipper 100 comprises a body 102 that includes a grip end 104, and a hook end 106. The body 102 is an elongated member having a substantially circular cross section, although other cross section shapes, such as rectilinear, irregular, etc., are also contemplated. The grip end 104 advantageously includes a grip 108 having a ridged, ribbed, abraded, or brushed surface or the like that is configured to be gripped by a user. In an example, the grip 108 extends over less than an entirety of a circumference of the body 102 in order to, for example, provide direction as to where to grip the wheel tipper 100 and how to orient the wheel tipper 100 during use.

Figure 6:
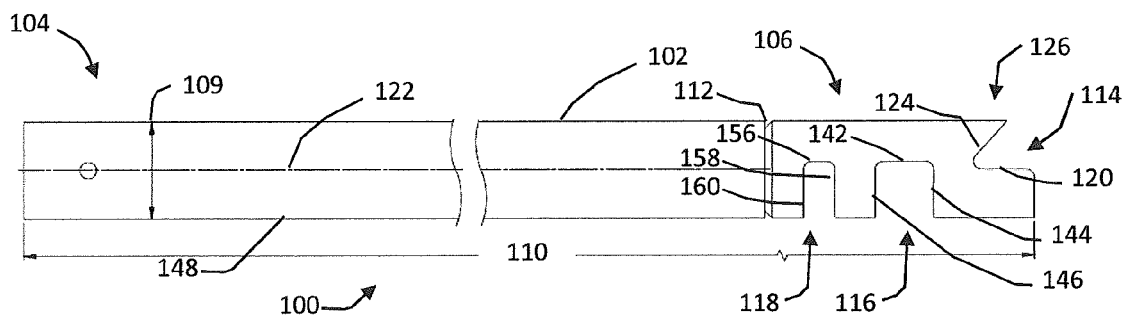
FIG. 6 shows a side view of the wheel tipper of FIG. 5, with a portion of the body of the wheel tipper abridged.

As illustrated in FIG. 6, the cross section of the body 102 has a diameter 109, which in certain embodiments may be approximately 1.5 inches, although other sizes are also contemplated in order to, for example, accommodate different size wheels. The body 102 in one example is a substantially linear member having a length 110 of approximately 5 feet, although members of other lengths and shapes are also contemplated.

The body 102 can be formed, for example, from a metal or metal alloy such as steel or iron, composite materials, plastics, rubbers, woods, or combinations thereof. The body 102 may be substantially hollow or substantially solid. Advantageously, the grip end 104 and hook end 106 are formed on the body 102 via molding, etching, milling, cutting, and/or any other customary process such that the wheel tipper 100 is formed as a single workpiece. In another embodiment, the grip end and/or the hook end is affixed to the body via, for example, welding, screwing, bolting, clamping, or the like.

In the present embodiment, the hook end 106 is connected to the body 102 via a collar 112. The collar 112 can be, for example, a milled bevel, and can be configured to reinforce the connection between the body 102 and the hook end 106.

Figure 7:
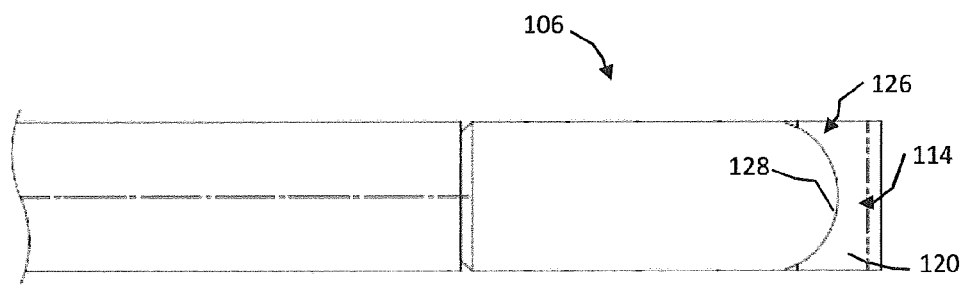
FIG. 7 shows a top view of a hook end of the wheel tipper of FIG. 5.

The hook end 106 includes a plurality of different notches, such as notches 114, 116, and 118, which are each configured to accommodate a different wheel manipulation. The first notch 114 has a shape similar to a triangular divot, and is formed by a first surface 120 that is substantially parallel to a mid-plane 122 of the wheel tipper 100 and a second surface 124 at an acute angle with the first surface such that the first notch 114 forms a lip 126. The angle between the first surface 128 and the second surface 124 can be rounded or beveled. In an example, the angle is about 40 degrees to about 70 degrees, or more particularly, about 55 degrees. As shown in FIG. 7, the lip 126 formed by the second surface 124 has an arcuate edge 128. Advantageously, beveling, rounding, or arcing edges such as the edge 128 reduces a risk of damaging the wheel during use. The first notch 114 is configured for a wheel manipulation of a wheel having a hub flange facing downward. In an example, the first surface 120 is approximately 0.75 inches long, although other lengths are also contemplated.

Figure 8:
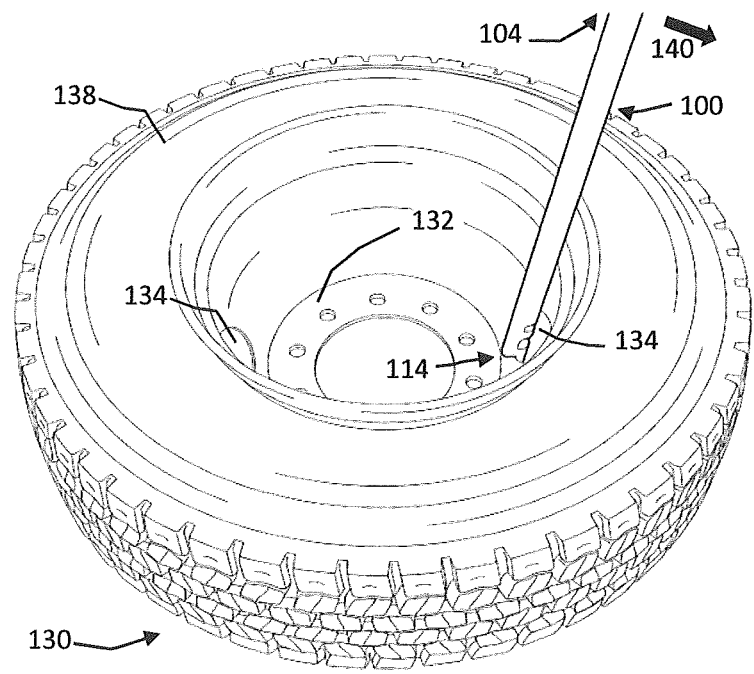
FIG. 8 shows a first notch of the hook end of the wheel tipper of FIGS. 5-7 being used to hook a hole of a wheel to be tipped into an upright position.

FIG. 8 is a perspective illustration of the first notch 114 of the wheel tipper 100 being used to manipulate a wheel 130 in a position wherein a hub flange 132 of the wheel 130 is facing downward. The first notch 114 is hooked into one of the wheel holes 134 that is advantageously not proximate to a valve stem (not illustrated) used to inflate/deflate a tire 138 of the wheel 130. In an example, the first notch 114 is hooked into the wheel hole 134 that is opposite the valve stem. If a wheel hole proximate to the valve stem is hooked, the valve stem is at risk of being damaged during the wheel manipulation, such as by being bent by the wheel tipper 100, for example.

Figure 9:
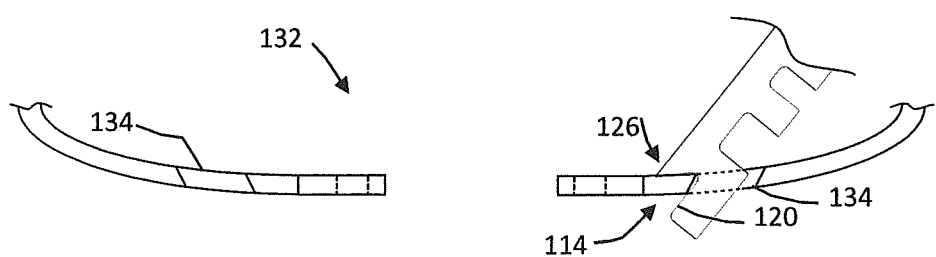
FIG. 9 shows a cross section view of the first notch of the hook end of the wheel tipper of FIG. 8 being used to hook the wheel hole of the wheel.

As shown in FIG. 9, the first notch 114 engages the wheel hole 134 such that the first surface 120 engages a side of the wheel hole 134, and the lip 126 engages a portion of the hub flange 132 around the wheel hole 134. Once the first notch 114 has been hooked into a wheel hole, the grip end 104 is pulled in a direction 140 down and away from the wheel 130, causing the wheel 130 to be tipped up into an upright position. The wheel tipper 100 may then be removed from the wheel 130.

Returning to FIG. 6, the second notch 116 has a shape similar to a substantially square-shaped divot, and is formed by an inner surface 142 that is substantially parallel to the mid-plane 122, and a pair of sidewalls 144, 146 that extend from a side 148 of the body 102 opposite the edge 128, through the mid-plane 122, and to each end of the inner surface 142, and that are substantially perpendicular to the mid-plane 122. A length of the sidewalls 144, 146 is substantially similar to a length of the inner surface 142. As illustrated in FIG. 8, the second notch 116 is located between the first notch 114 and the collar 112. Corners between the sidewalls 144, 146 and the inner surface 142 are advantageously beveled or curved. The second notch 116 is configured for a wheel manipulation of a wheel having an aluminum rim and having a hub flange facing upward. In one aspect, the inner surface 142 has a length configured to hook a wheel rim having a certain thickness, such as an aluminum rim. In an example, the inner surface 142 and the pair of sidewalls 144, 146 are approximately 1 inch long, although other lengths are also contemplated.

Figure 10:
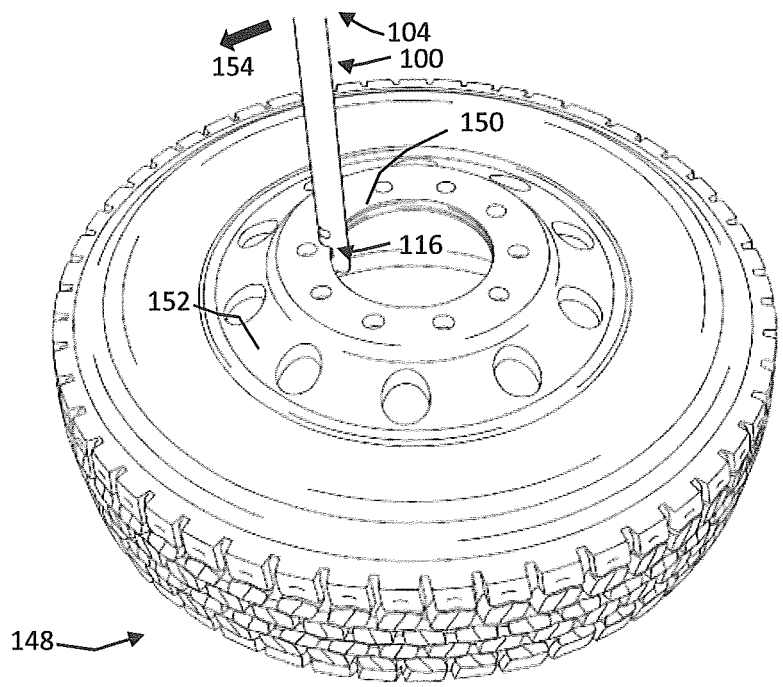
FIG. 10 shows a second notch of the hook end of the wheel tipper of FIGS. 5-7 being used to hook a rim of a wheel to be tipped into an upright position.

FIG. 10 is a perspective illustration of the second notch 116 of the wheel tipper 100 being used to manipulate a wheel 148 having an aluminum rim 150, and being in a position wherein a hub flange 152 of the wheel 148 is facing upward. The second notch 116 is hooked onto the aluminum rim 150, and the grip end 104 is pulled in a direction 154 down and away from the wheel 148, causing the wheel 148 to be tipped up into an upright position. The wheel tipper 100 may then be removed from the wheel 148.

Returning again to FIG. 6, the third notch 118 has a shape similar to a rectangular divot, and is formed by an inner surface 156 that is substantially parallel to the mid-plane 122, and a pair of sidewalls 158, 160 that extend from the side 148 of the body 102 opposite the edge 128, through the mid-plane 122, and to each end of the inner surface 156, and that are substantially perpendicular to the mid-plane 122. A length of the sidewalls 158, 160 is greater than a length of the inner surface 156. As illustrated in FIG. 8, the third notch 118 is located between the second notch 116 and the collar 112, although other locations, such as between the first notch 114 and the second notch 116, are also contemplated. Corners between the sidewalls 158, 160 and the inner surface 156 are advantageously beveled or curved. The third notch 118 is configured for a wheel manipulation of a wheel having a steel rim and having a hub flange facing upward. In one aspect, the inner surface 156 has a length configured to hook a wheel rim having a certain thickness, such as a steel rim. In an example, the inner surface 156 is approximately 0.5 inches and a length of the sidewalls 158, 160 is about 1 inch, although other lengths are also contemplated.

Figure 11:
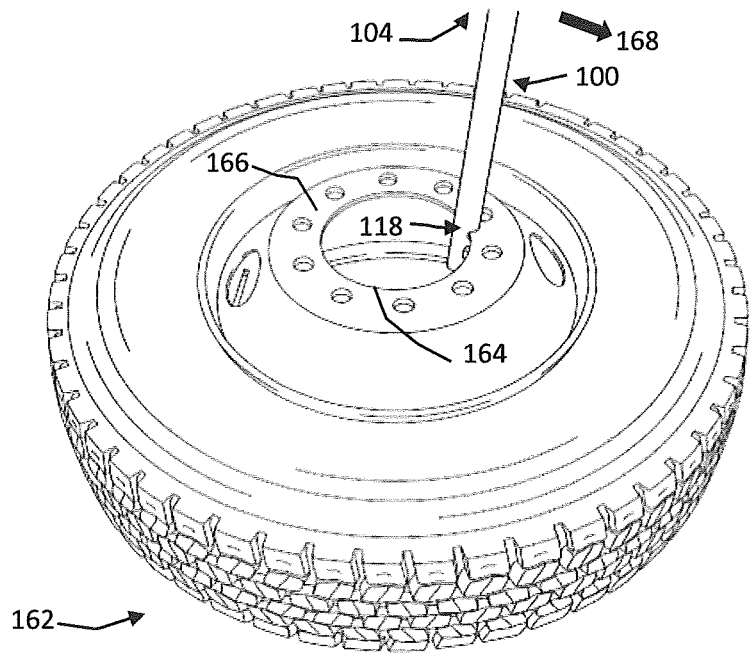
FIG. 11 shows a third notch of the hook end of the wheel tipper of FIGS. 5-7 being used to hook a rim of a wheel to be tipped into an upright position.

FIG. 11 is a perspective illustration of the third notch 118 of the wheel tipper 100 being used to manipulate a wheel 162 having a steel rim 164, and being in a position wherein a hub flange 166 of the wheel 162 is facing upward. The third notch 118 is hooked onto the steel rim 164, and the grip end 104 is pulled in a direction 168 down and away from the wheel 162, causing the wheel 162 to be tipped up into an upright position. The wheel tipper 100 may then be removed from the wheel 162.

As illustrated in FIGS. 8-11, the wheel tipper 100 can be used to manipulate the wheels 130, 148, and 162 without deflating or breaking a bead of a tire. Further, by including a plurality of notches, the wheel tipper 100 can be used for a wider variety of wheel manipulations, compared to a conventional wheel tipper having only a single hook.

Figure 12:
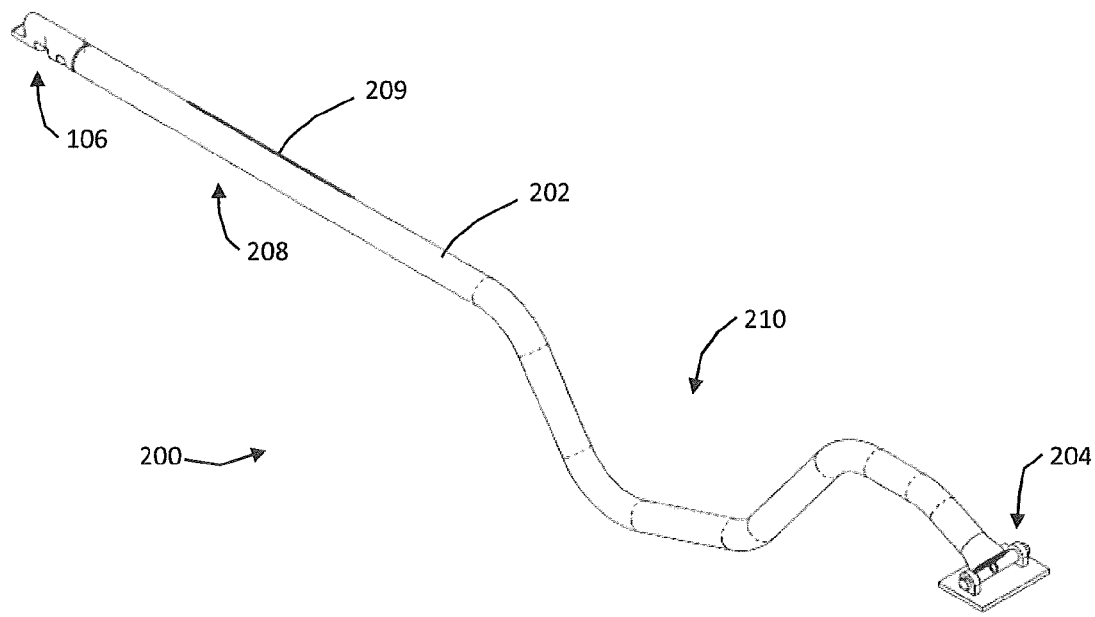
FIG. 12 shows a perspective illustration of a wheel lifter and tipper device having a u-shaped bend according to the present disclosure.
Figure 13:
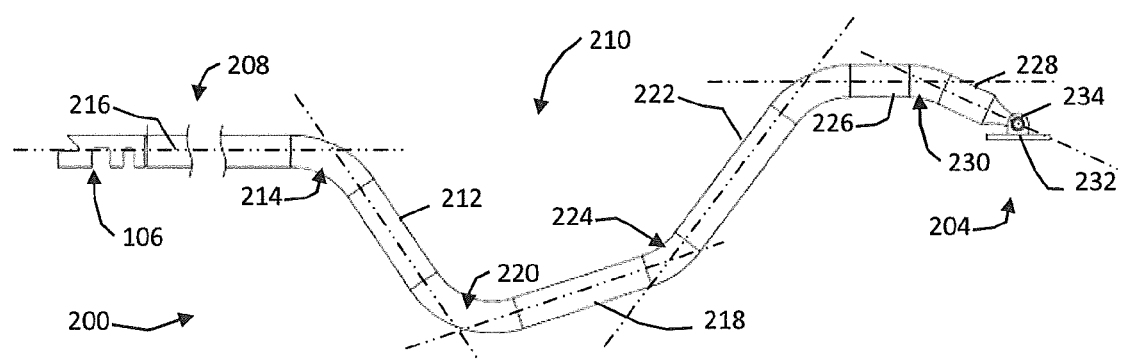
FIG. 13 shows a side view of the wheel lifter and tipper device of FIG. 12.

It is further desirable for a wheel lifter and tipper device to be additionally configured for such tasks as placing and removing a wheel on and from a raised surface, such as when loading or unloading a wheel in a truck bed, for example. FIG. 12 is a perspective view of an exemplary embodiment of a wheel lifter and tipper device 200 which is configured for loading and unloading wheels to and from raised surfaces. The device 200 comprises a body 202, a pad end 204, and a hook end 106. The body 202 includes a grip portion 208 that extends from the hook end 106 along an axis of the hook end 106, and that is configured to be gripped by a user during a wheel loading manipulation. Advantageously, the grip portion 208 includes a grip 209 configured to be gripped by a user during a wheel loading manipulation. The body 202 also includes wheel support segment, also referred to as a u-shaped bend 210, that extends from the grip portion 208 to the pad end 204, and that is configured to be passed through and support a wheel during a wheel loading manipulation. The u-shaped bend 210 includes a plurality of bend portions, as shown in FIG. 13.

A first bend portion 212 extends from the grip portion 208 (partially abbreviated in FIG. 13) in a direction away from the hook end 106 at a first obtuse angle 214 relative to a mid-plane 216 of the hook end 106. A second bend portion 218 extends from the first bend portion 212 in a direction away from the hook end 106 and towards the mid-plane 216. The first bend portion 212 and the second bend portion 218 form a second obtuse angle 220. A third bend portion 222 extends from the second bend portion 218 in a direction away from the hook end 106, and passes beyond the mid-plane 216. The second bend portion 218 and the third bend portion 222 form a third obtuse angle 224. A fourth bend portion 226 extends from the third bend portion 222 in a direction substantially parallel to the mid-plane 216, and a fifth bend portion 228 extends from the fourth bend portion 226 into the pad end 204 in a direction away from the hook end 206 and towards the mid-plane 216. The fourth bend portion 226 and the fifth bend portion 228 form a fourth obtuse angle 230.

In one example, the first obtuse angle 214 is in a range of about 100 degrees to about 130 degrees, or more particularly is about 125 degrees, the second obtuse angle 220 is about 91 degrees to about 120 degrees, or more particularly about 105 degrees, the third obtuse angle 224 is about 120 degrees to about 150 degrees, or more particularly about 145 degrees, and the fourth obtuse angle 230 is about 130 degrees to about 170 degrees, or more particularly about 155 degrees. Other angles are also contemplated. Advantageously, values of the angles 214, 220, 224, and 230 are configured such that, as the device 200 is rotated during a loading manipulation, the wheel is successively supported by bend portions of the u-shaped bend 210 at angles such that the wheel slides along the device 200 in a desired direction until resting on a desired surface or on a portion of the wheel support segment 210.

Adjoining bend portions of the wheel support segment 210 are advantageously connected via continuous curves, which facilitate the wheel sliding along the device 200 during the wheel loading manipulation as described in further detail below. Other connections between adjoining bend portions, such as sharp, beveled, or rounded corners are also contemplated. It should be understood that u-shaped bends with different and different numbers of bend portions are also contemplated. Advantageously, the u-shaped bend 210 is formed in the body 202 such that a single workpiece is bent, molded, or cast, etc., to form the body 202 having the u-shaped bend 210. In another embodiment, a plurality of separate members are connected, such as via a weld, screw, bolt, clamp, etc., in order to form the body 202 having the u-shaped bend 210.

The pad end 204 is configured to act as a lever fulcrum during the wheel loading manipulation, as described in further detail below. The pad end 204 includes a pad foot 232 and a connector 234 that rotationally mounts the pad foot 232 onto the body 202, such that, during the wheel lifting manipulation, the pad foot 232 is configured to act as a fulcrum base, wherein the body 202 thus acts as a lever arm that rotates about the pad foot 232 via the rotationally mounted connector 234. In the present embodiment, the connector 234 is a pin hinge, although other connectors, such as ball-and-socket joints and other rotational mounts are also contemplated. The pad foot 232 is formed, for example, from steel or other materials that can be used to form the body 202, and can further include a footing on a bottom face of the pad foot 232 that is configured to impede motion of the pad end 204 during a loading manipulation such as, for example, a rubber footing, a clamp, a weight, screw connection for connecting to the raised surface, etc.

Figure 14:
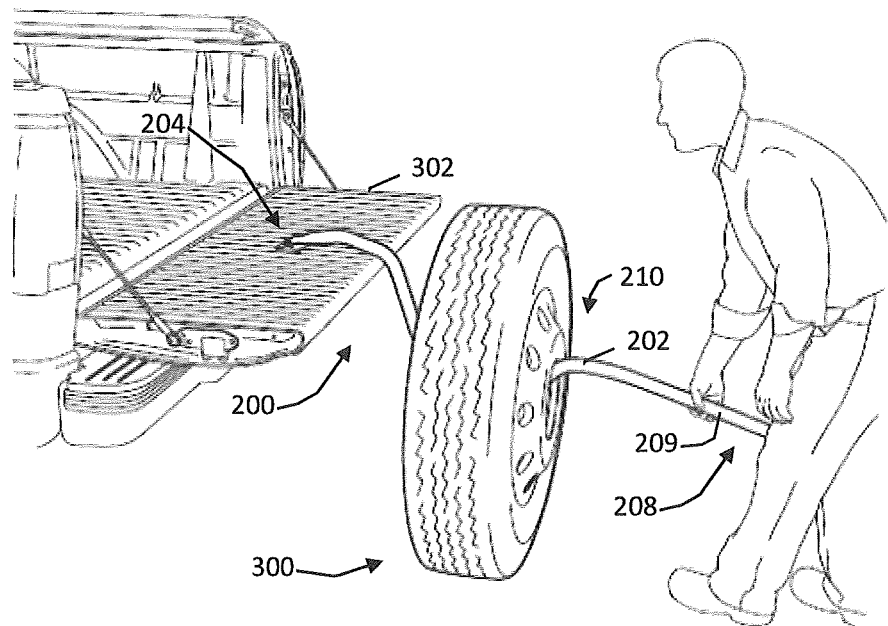
FIG. 14 shows a perspective illustration of a wheel to be loaded onto a raised surface with the wheel lifter and tipper device of FIGS. 12 and 13 according to the present disclosure.
Figure 15:
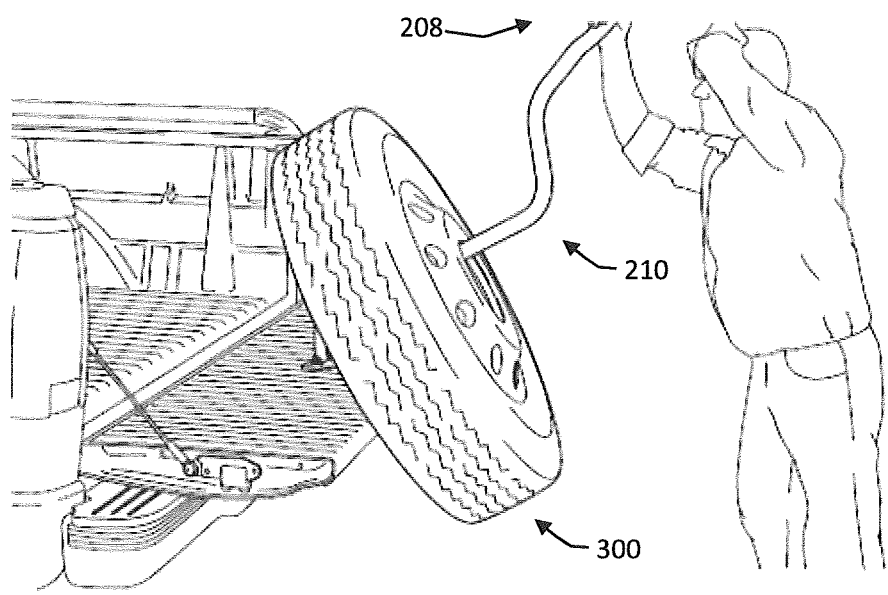
FIG. 15 shows a perspective illustration of a wheel in the process of being loaded onto a raised surface with the wheel lifter and tipper device of FIGS. 12 and 13 according to the present disclosure.
Figure 16:
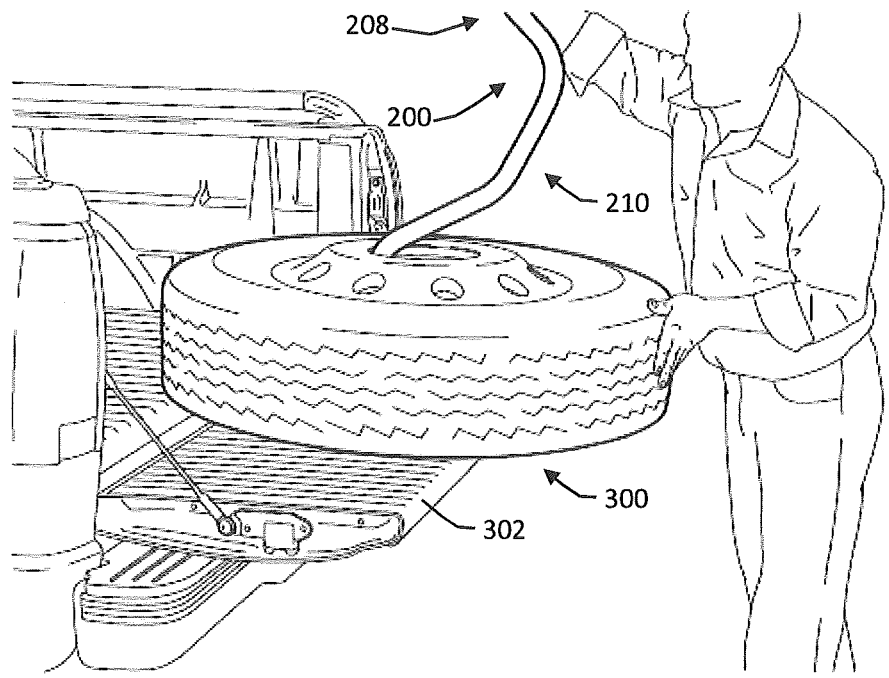
FIG. 16 shows a perspective illustration of a wheel loaded on a raised surface the wheel lifter and tipper device of FIGS. 12 and 13 according to the present disclosure.

FIGS. 14-16 illustrate the device 200 being used for a wheel loading manipulation where a wheel 300 is loaded onto a raised surface 302 of a truck bed, although other raised surfaces including work tables, loading bays, etc., are also contemplated. The wheel 300 is positioned, in an upright position, proximate to the raised surface 302 with a center of the wheel 300 substantially facing the raised surface 302. In an example, the wheel 300 is first manipulated into the upright position using the hook end of the device 200. Advantageously, the wheel is positioned approximately 1 foot away from the raised surface.

FIG. 14 illustrates the device 200 having been inserted and passed through the center of the wheel 300 such that the pad end 204 of the device 200 is resting on the raised surface 302. The grip portion 208 of the device 200 is then lifted, such that the wheel 300 slides along the various bend portions of the u-shaped bend 210 until the wheel 300 rests on the raised surface 302 or on a portion of the wheel support segment 210. In an example, a user grips the grip 209 in order to raise the grip portion 208, whereby the body 202 acts as a lever and lifts the wheel 300 as it slides along the u-shaped bend 210. The wheel 300 slides along the u-shaped bend until reaching a next portion at an angle that stops the sliding. The grip 209 can then be raised again to continue sliding the wheel 300, and so on until the wheel 300 rests on the raised surface 302. The pad end 204 remains substantially stationary, such that the body 202 of the device 200 rotates about the connector as the grip portion 208 is lifted. As described above, the various bend portions are angled such that as device 200 is lifted, the wheel is supported by bend portions angled to direct the wheel in a desired direction. FIG. 14 illustrates the wheel 300 sliding along the u-shaped bend 210 as the grip portion 208 is raised, and FIG. 15 illustrates the wheel 300 having reached a stable position on the raised surface 302. The device 200 can then be removed from the wheel 300.

Figure 17:
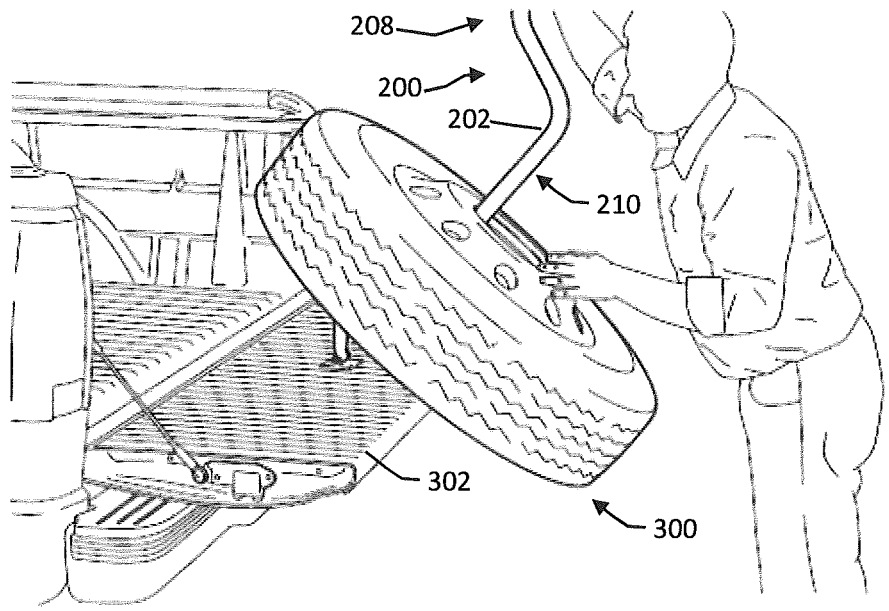
FIG. 17 shows a perspective illustration of a wheel in the process of being unloaded from a raised surface with the wheel lifter and tipper device of FIGS. 12 and 13 according to the present disclosure.
Figure 18:
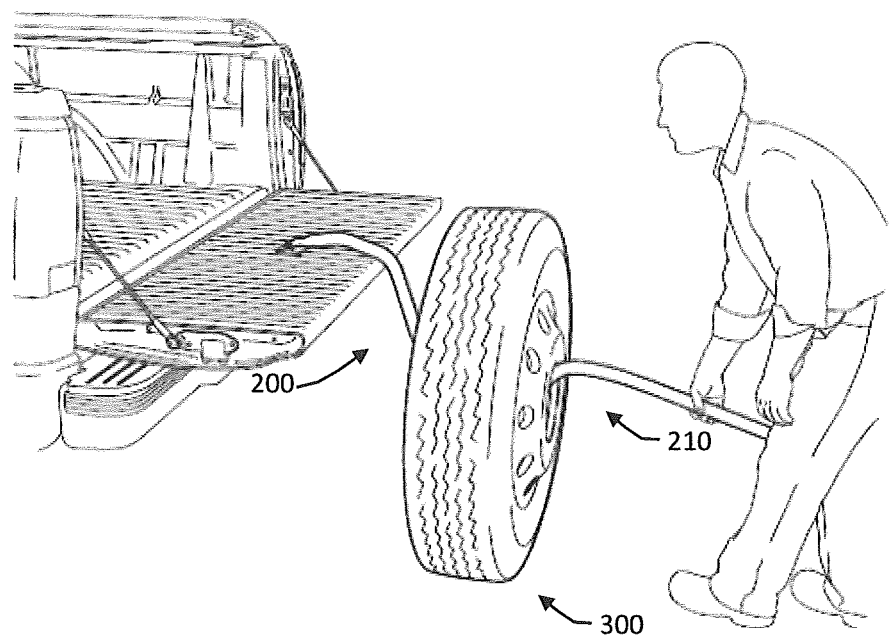
FIG. 18 shows a perspective illustration of a wheel unloaded from a raised surface with the wheel lifter and tipper device of FIGS. 12 and 13 according to the present disclosure.

In order to unload the wheel 300 when on a raised surface 302 as illustrated in FIG. 16, the device 200 is passed through the center of the wheel 300 such that the pad end (inside the center of the wheel 300) is resting on the raised surface 302. As illustrated in FIG. 17, while securing the grip portion 208 of the device 200 (e.g. with one hand of a user gripping the grip 209) the wheel is pulled of the raised surface 302 off (e.g. with another hand of the user) and onto the u-shaped bend 210 of the device 200. The grip portion 208 is then lowered, whereby the body 202 acts as a lever that lowers the wheel 300 as it slides along the u-shaped bend 210 until the wheel 300 is unloaded and in an upright position, as illustrated in FIG. 18.

The device 200, in addition to being configured for loading manipulations, described below, is also configured for the tipping manipulations described above and illustrated in FIGS. 8-11. When used for such a manipulation, the fourth bend portion 226 replaces the function of the grip end 104 of the wheel tipper 100. In other words, when the hook end 106 of the device 200 is hooked onto a wheel, the fourth bend portion 226 is pulled down and away from the wheel in order to manipulate the wheel into an upright position. Advantageously, the u-shaped bend 210 is configured such that the fourth bend portion 226 is further configured as an ergonomic handle for wheel tipping manipulations using the hook end 106. Because the device 200 includes the plurality of notches in the hook end 106 as well as the u-shaped bend 210 and pad end 204, the device is configured to perform a wide variety of tasks and wheel manipulations that, in the past, either required multiple different tools, or put technicians at risk of injury, such as back strain from lifting or moving wheels.

It will be appreciated that variants of the above-described and other features and functions, or alternatives thereof, may be desirably combined into many other different systems, applications, or methods. Various presently unforeseen or unanticipated alternatives, modifications, variations or improvements may be subsequently made by those skilled in the art that are also intended to be encompassed by the disclosure.

What is claimed is:

1. A wheel lifter and tipper device, comprising:
    an elongated body that extends, at least in part, in a direction substantially parallel to a mid-plane:
    a hook end at a first end of the elongated body, and that includes:
        an end face that defines a plane transverse to the mid-plane; and
        a notch in the end face, having a substantially triangular shape defined by a first surface substantially parallel to the mid-plane of and a second surface at an acute angle to the first surface, the notch configured to hook onto a wheel hole in a rim of a wheel, and
    a distal end at a second end of the elongated body opposite the first end, and configured to be gripped by a user when the hook end is hooked onto a portion of the wheel.

2. The wheel lifter and tipper device of claim 1, wherein:
    the hook end further includes at least one further notch located on a side of the hook end;
    the at least one further notch is defined by a substantially rectangular shape;
    an inner surface of the substantially rectangular shape is substantially parallel with the mid-plane;
    the at least one notch extends from the side and beyond the mid-plane; and
    the at least one further notch is configured to hook onto a portion of one of a steel wheel rim or an aluminum wheel rim.

3. The wheel lifter and tipper device of claim 1, wherein the elongated body has a substantially circular cross section.

4. The wheel lifter and tipper device of claim 3, wherein the substantially circular cross section has a diameter of approximately 1.5 inches.

5. The wheel lifter and tipper device of claim 1, wherein the distal end includes a grip portion.

6. The wheel lifter and tipper device of claim 1, wherein the second surface forms a lip on the end face such that the lip has a curved edge when viewed from a direction normal to the first surface.

7. A wheel lifter and tipper device, comprising:
    an elongated body that includes:
        a lever end and configured to be gripped by a user during a wheel loading manipulation;
        a pad end configured to act as a lever fulcrum during the wheel loading manipulation; and
        a substantially u-shaped bend between the lever end and the pad end, configured to be passed through and support a center of a wheel during the wheel loading manipulation, the u-shaped bend including a plurality of bend portions that successively support the wheel as the center of the wheel slides along the u-shaped bend due to motion of the lever end relative to the pad end, and the u-shaped bend defining a larger extent of the elongated body than both the lever end and the pad end.

8. The wheel lifter and tipper device of claim 7, wherein the pad end comprises:
a pad foot; and
a connector that rotationally mounts the pad foot to the elongated body such that, during the wheel loading manipulation, the pad foot is configured to act as a fulcrum base, and the elongated body is configured to act as a lever arm and rotate via the connector about the pad foot.

9. The wheel lifter and tipper device of claim 7, wherein the u-shaped bend includes:
a first bend portion extending from the grip portion in a direction away from the hook end at a first obtuse angle relative to a mid-plane of the hook end;
a second bend portion extending from the first bend portion in a direction away from the hook end and towards the mid-plane, wherein the first bend portion and the second bend portion form a second obtuse angle;
a third bend portion extending from the second bend portion in a direction away from the hook end and beyond the mid-plane, wherein the second bend portion and the third bend portion form a third obtuse angle;
a fourth bend portion extending from the third bend portion in a direction substantially parallel to the mid-plane; and
a fifth bend portion extending from the fourth bend portion into the pad end in a direction away from the hook end and towards the mid-plane, wherein the fourth bend portion and the fifth bend portion form a fourth obtuse angle.

10. The wheel lifter and tipper device of claim 9, wherein:
the first obtuse angle is in a range of about 100 degrees to about 130 degrees;
the second obtuse angle is about 91 degrees to about 120 degrees;
the third obtuse angle is about 120 degrees to about 150 degrees; and
the fourth obtuse angle is about 130 degrees to about 160 degrees.

11. The wheel lifter and tipper device of claim 9, wherein:
the lever end further includes a hook end having at least one notch configured to hook onto a portion of a wheel during a wheel tipping manipulation; and
the fourth bend portion is further configured to act as an ergonomic grip during the wheel tipping manipulation.

12. The wheel lifter and tipper device of claim 7, wherein a distance from the lever end to the pad end is approximately 5 feet.

13. The wheel lifter and tipper device of claim 7, wherein the wheel lifter and tipper device is formed from a metal, composite, rubber, plastic, ceramic, or combination thereof.

14. A method of using a wheel lifter and tipper device for lifting a wheel onto a raised surface, comprising:
positioning a wheel, in an upright position, on a starting surface proximate to a raised surface onto which the wheel is desirably lifted, the raised surface being raised relative to the starting surface;
passing a wheel lifter and tipper device through a center of the wheel such that the wheel is supported by a u-shaped bend of the wheel lifter and tipper device;
resting a pad end of the wheel lifter and tipper device on the raised surface; and
lifting a handle end of the wheel lifter and tipper device that is opposite the pad end, such that the wheel slides down the wheel lifter and tipper device and onto the raised surface.

15. The method of using the wheel lifter and tipper device of claim 14, further comprising manipulating the wheel into the upright position;
wherein the handle end of the wheel lifter and tipper device includes a hook end; and
wherein the manipulating includes:
hooking the hook end into a hole in a rim of the wheel or onto the rim of the wheel; and
pushing down on a grip portion of the u-shaped bend proximate to the pad end, such that the wheel is levered into the upright position.

16. A method of using a wheel lifter and tipper device for unloading a wheel from a starting surface to a lower surface, the lower surface being lowered relative to the starting surface, comprising:
passing a pad end of a wheel lifter and tipper device through a center of a wheel resting on a starting surface such that the pad end rests on the starting surface;
while securing a grip end of the wheel lifter and tipper device, pulling the wheel off of the starting surface such that the wheel rests on a u-shaped bend of the wheel lifter and tipper device; and
lowering the grip end of the wheel lifter and tipper device, such that the wheel slides down the wheel lifter and tipper device and rests on a lower surface in an upright position.

17. A wheel lifter and tipper device, comprising:
an elongated body that includes:
a hook end at a first end of the elongated body, having a plurality of notches configured to hook, during a wheel tipping manipulation, onto portions of a wheel that are exposed when a tire of the wheel is inflated and a bead of the tire is unbroken;
a grip portion proximate to the hook end and configured to be gripped during a wheel loading manipulation;
a substantially u-shaped bend configured to be passed through and support a wheel during the wheel loading manipulation, wherein the u-shaped bend includes a grip bend portion configured to be gripped during the wheel tipping manipulation; and
a pad end at a second end of the elongated body opposite the first end, and configured to act as a lever fulcrum during the wheel loading manipulation
the u-shaped bend disposed between the grip portion and the pad end, the-u-shaped portion including a plurality of bend portions that successively support the wheel as the center of the wheel slides along the u-shaped bend due to motion of the grip portion relative to the pad end during the wheel loading manipulation, and the u-shaped bend defining a larger extent of the elongated body than both the hook end and the pad end.

* * * * *